(12) United States Patent
Anasenzl et al.

(10) Patent No.: US 11,911,843 B2
(45) Date of Patent: Feb. 27, 2024

(54) METHOD FOR INTEGRALLY BONDING A CAST ALUMINUM PART TO A JOINING PARTNER, AND PART

(71) Applicant: Bayerische Motoren Werke Aktiengesellschaft, Munich (DE)

(72) Inventors: Manuel Anasenzl, Mainburg (DE); Jean-Marc Segaud, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 325 days.

(21) Appl. No.: 16/117,943

(22) Filed: Aug. 30, 2018

(65) Prior Publication Data

US 2018/0369956 A1   Dec. 27, 2018

Related U.S. Application Data

(63) Continuation of application No. PCT/EP2017/053850, filed on Feb. 21, 2017.

(30) Foreign Application Priority Data

Mar. 2, 2016   (DE) ..................... 10 2016 203 363.8

(51) Int. Cl.
*B29C 65/00* (2006.01)
*B23K 26/0622* (2014.01)
(Continued)

(52) U.S. Cl.
CPC ........ *B23K 26/0622* (2015.10); *B23K 26/352* (2015.10); *B23K 26/355* (2018.08);
(Continued)

(58) Field of Classification Search
CPC ....... B29C 65/002; B29C 65/02; B29C 65/16; B29C 65/48; B29C 66/02; B29C 66/024;
(Continued)

(56) References Cited

U.S. PATENT DOCUMENTS

| 4,861,407 A | 8/1989 | Volkmann et al. |
| 2010/0108651 A1 | 5/2010 | Stahr |

(Continued)

FOREIGN PATENT DOCUMENTS

| CN | 1730227 A | 2/2006 |
| CN | 101253036 A | 8/2008 |

(Continued)

OTHER PUBLICATIONS

Translation-WO2013091607.pdf (Year: 2013).*

(Continued)

*Primary Examiner* — Philip C Tucker
*Assistant Examiner* — Nickolas R Harm
(74) *Attorney, Agent, or Firm* — Crowell & Moring LLP

(57) ABSTRACT

A method for integrally bonding a cast aluminum component to a joining partner. The method includes laser-treating a region of the cast aluminum component that is to be connected to the joining partner. The laser treatment is carried out via a pulsed laser system having a pulse duration of 100 to 200 ns, and an impulse frequency of 10 to 80 kHz. The method also includes integrally bonding the cast aluminum component and the joining partner.

12 Claims, 1 Drawing Sheet

(51) Int. Cl.
*C09J 5/02* (2006.01)
*B23K 26/352* (2014.01)
*B23K 103/10* (2006.01)
*B29C 65/16* (2006.01)
*B29C 65/02* (2006.01)
*B29C 65/48* (2006.01)

(52) U.S. Cl.
CPC ........... *B23K 26/3568* (2018.08); *C09J 5/02* (2013.01); *B23K 2103/10* (2018.08); *B29C 65/002* (2013.01); *B29C 65/02* (2013.01); *B29C 65/024* (2013.01); *B29C 65/16* (2013.01); *B29C 65/48* (2013.01); *B29C 66/02* (2013.01); *B29C 66/024* (2013.01); *C09J 2301/416* (2020.08); *C09J 2400/163* (2013.01); *C09J 2400/166* (2013.01)

(58) Field of Classification Search
CPC ........... B23K 26/0622; B23K 26/352; B23K 26/3568
See application file for complete search history.

(56) References Cited

U.S. PATENT DOCUMENTS

| | | | |
|---|---|---|---|
| 2010/0294347 A1 | 11/2010 | Zimmer et al. | |
| 2014/0262642 A1 | 9/2014 | Schluck et al. | |
| 2014/0356578 A1 | 12/2014 | Brandl et al. | |
| 2016/0100498 A1* | 4/2016 | Jiao | B22D 31/002 156/257 |

FOREIGN PATENT DOCUMENTS

| | | |
|---|---|---|
| CN | 101678502 A | 3/2010 |
| CN | 101971351 A | 2/2011 |
| DE | 10 2007 020 748 A1 | 11/2008 |
| DE | 10 2008 022 142 B3 | 11/2009 |
| DE | 10 2011 121 546 A1 | 6/2013 |
| JP | 2001-219285 A | 8/2001 |
| WO | WO 2012/156114 A1 | 11/2012 |
| WO | WO 2013/091607 A2 | 6/2013 |
| WO | WO 2015/172797 A1 | 11/2015 |

OTHER PUBLICATIONS

Translation of WO2013/091607 (Year: 2013).*
Translation of WO2012/156114 (Year: 2012).*
English Translation of Chinese-language Office Action issued in counterpart Chinese Application No. 201780004106.0 dated May 8, 2019 (nine (9) pages).
International Search Report (PCT/ISA/210) issued in PCT Application No. PCT/EP2017/053850 dated Jun. 16, 2017 with English translation (six (6) pages).
German-language Written Opinion (PCT/ISA/237) issued in PCT Application No. PCT/EP2017/053850 dated Jun. 16, 2017 (six (6) pages).
German-language Search Report issued in counterpart German Application No. 102016203363.8 dated Aug. 8, 2016 with partial English translation (11 pages).
Partial English translation of document C6 (Minghuan et al., "Improvement of Al—Cu—Mg alloy," in: Progress of Nonferrous Metal 1996-2005, Non-ferrous Metal Processing, Dec. 31, 2007, p. 42) previously filed on Jan. 24, 2020 (six (6) pages).
English translation of Chinese Office Action issued in Chinese Application No. 201780004106.0 dated Jul. 2, 2020 with (six (6) pages).
Chinese-language Office Action issued in counterpart Chinese Application No. 201780004106.0 dated Dec. 30, 2019 with English translation (14 pages).
Minghuan et al., "Improvement of Al—Cu—Mg alloy," in: Progress of Nonferrous Metal 1996-2005, Non-ferrous Metal Processing, Dec. 31, 2007, p. 42 (two (2) pages).

* cited by examiner

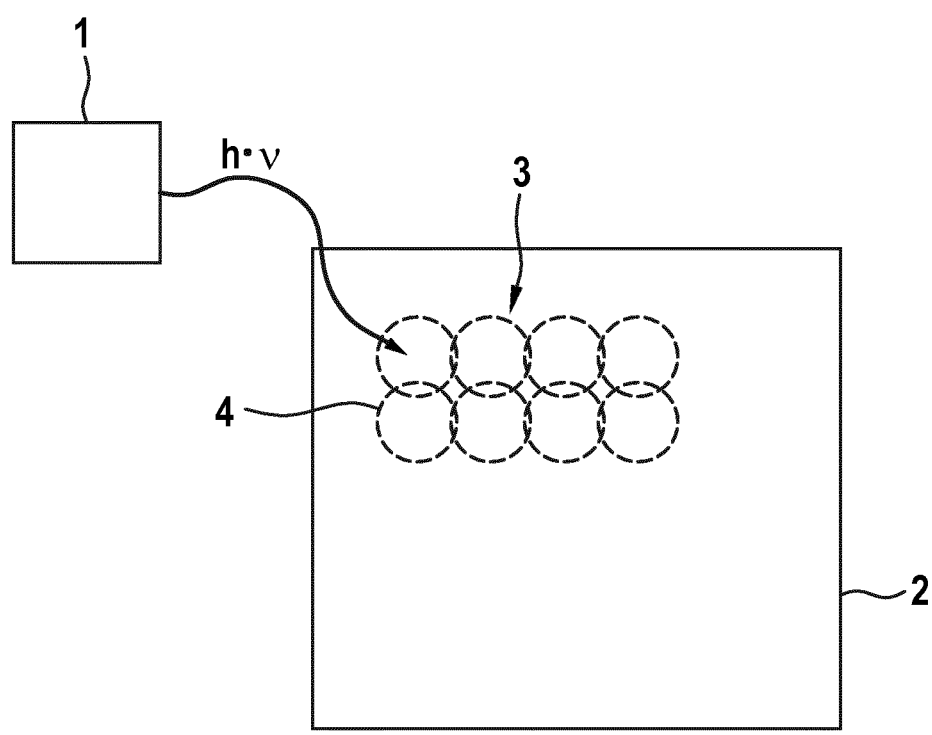

METHOD FOR INTEGRALLY BONDING A CAST ALUMINUM PART TO A JOINING PARTNER, AND PART

CROSS REFERENCE TO RELATED APPLICATIONS

This application is a continuation of PCT International Application No. PCT/EP2017/053850, filed Feb. 21, 2017, which claims priority under 35 U.S.C. § 119 from German Patent Application No. 10 2016 203 363.8, filed Mar. 2, 2016, the entire disclosures of which are herein expressly incorporated by reference.

BACKGROUND AND SUMMARY OF THE INVENTION

The embodiments of the present invention relate to a method for integrally bonding a cast aluminum component to a joining partner, and to the use of a pulsed laser system. The embodiments of the present invention also relate to a component which comprises a cast aluminum component and a joining partner which are integrally bonded.

In order for two cast aluminum components to be integrally bonded it is necessary for the surface of the components to be treated beforehand, so as to achieve a sufficient strength of the join connection in the subsequent joining process. The surface treatment usually comprises chemical washing or acid cleaning, passivating the surfaces, and providing cathodic dip painting. The processes that are applied are largely chemical and thus stress both the environment as well as the health of the people involved in the process. Moreover, said surface treatment processes in terms of logistics and process technology are complex and cause high operating and maintenance costs.

An object of the embodiments of the present invention is to provide a low-maintenance and cost-effective method that is simple to apply for integrally bonding a cast aluminum component and a joining partner, the method being environmentally friendly and dispensing with chemical resources, and moreover not being hazardous to health in the application thereof.

This and other objects are achieved by a method for integrally bonding a cast aluminum component to a joining partner in which a pulsed laser system is used. The inventive method comprises a step of laser-treating a region of the cast aluminum component that is to be connected to the joining partner, wherein a pulse duration of the pulsed laser system is 100 to 200 ns, and an impulse frequency is 10 to 80 kHz. The method can also provide a plurality of laser treatment steps, as long as at least one of said steps, in particular the last laser treatment step, is carried out by means of a pulsed laser system having a pulse duration of 100 to 200 ns, and an impulse frequency of 10 to 80 kHz.

The joining partner can be composed of arbitrary materials, in particular of metallic material such as, for example, steel or aluminum or a metallic alloy. Alternatively, plastics or fiber-composite plastics can be applied as a material for the joining partner.

It has been surprisingly demonstrated that short pulse durations of 100 to 200 ns, combined with an impulse frequency of 10 to 80 kHz, causes a modification of the surface topology and of the surface tension of the region of the cast aluminum component that in a further method step is to be joined by integral bonding to the joining partner, this in turn leading to an improved adhesive strength of the joining region after the integral bonding. Furthermore, the treatment by way of the pulsed laser system enables a transformation of the peripheral regions of the aluminum casting substrate, on account of which the resistance of the cast aluminum component to corrosion is increased. By contrast, the use of CW (continuous wave) laser systems, or any deviation from the aforementioned pulse parameters, does not lead to any increase in the adhesive strength after the joining process by integral bonding. According to the inventive method, no chemical surface treatment steps are applied. Rather, the pulsed laser system which is applied according to the invention renders the use of chemical surface treatments obsolete, and is thus resource-saving as well as environmentally friendly, and without health risks in terms of the application of said pulsed laser system. Moreover, maintenance and repair costs can be reduced by way of the method according to the invention, and logistics costs, for example on account of transferring the cast aluminum component to different processing locations, can be avoided. The inventive method enables a targeted localized treatment of the region of the cast aluminum component that is to be connected to the joining partner at a high degree of automation of the process. Moreover, processing times can thus be shortened, and processing costs can additionally be lowered.

The laser system that is applied can comprise, for example, a radiation source, a cooling device for the radiation source, a conducting fiber from the radiation source to a scanner and thus a scanner (for the deflection of radiation), wherein the scanner can be disposed on a movable device, for example on a robot.

The integral bonding of the cast aluminum component to the joining partner after the laser treatment may be carried out without any further treatment of the region of the cast aluminum component that is to be connected to the joining partner. The processing times and the logistic complexity can be reduced on account thereof.

The impulse frequency may be 10 to 40 kHz. In fact, the impulse frequency may be 10 to 30 kHz. On account thereof, the surface topology and the surface tension of the cast aluminum component to be joined are modified in an optimal manner at a reduced effort in terms of energy, on account of which the adhesion in relation to the joining partner is increased.

For the aforementioned reasons, it is likewise advantageous for the pulse duration to be 120 to 160 ns, and in particular approximately 150 ns.

For the treatment of cast aluminum components, a wavelength of the laser system of 800 to 1200 nm has demonstrated to be particularly advantageous, since the pulse waves thus are very well absorbed and converted by the aluminum material. The wavelength may be 1064 nm.

For a particularly targeted application that is restricted in a localized manner, a beam diameter may be 500 to 1000 µm.

A mean laser output of the pulsed system may be 700 to 1000 W. On account thereof, the modification of the surface can be optimized, and damage to the cast aluminum component can be avoided in a particularly efficient manner.

The integral bonding of the cast aluminum component to the joining partner, subsequent to the treatment by way of the pulsed laser system, in terms of the detail of said integral bonding is not limited. Adhesive bonding methods, welding methods, or brazing/soldering methods are advantageously applied. The inventive method invention has demonstrated to be particularly advantageous when combined with an adhesive process. The adhesives that are usually used adhere particularly well to the laser-treated, modified surface topology of the region of the cast aluminum component to be joined.

The aluminum material is not limited, as long as aluminum accounts for the majority in % by mass in relation to the total weight of the cast aluminum component. A content of aluminum in the cast aluminum component that is to be connected to the joining partner particularly advantageously is at least 70% by mass in relation to the total weight of the cast aluminum component.

The use of a pulsed laser system having a pulse duration of 100 to 200 ns, and an impulse frequency of 10 to 80 kHz, in combination with an integral method for bonding a cast aluminum component to a joining partner is likewise described according to the invention. On account thereof, the adhesive strength between the joined workpieces can be significantly increased, and the durability of said adhesive strength can be prolonged.

The embodiments of the present invention also relate to a component. The component comprises a cast aluminum component and a joining partner, and is produced by the method described above. The joining region has been optimized, and the integrally bonded composite to form the joining partner provided has been improved, on account of the modification of the surface morphology and the surface topology of the cast aluminum component by means of the specific laser treatment.

Other objects, advantages and novel features of the embodiments of the present invention will become apparent from the following detailed description of one or more preferred embodiments when considered in conjunction with the accompanying drawing, in which:

BRIEF DESCRIPTION OF THE DRAWING

FIG. 1 shows a schematic illustration for visualizing the inventive method.

The embodiments of the present invention will be explained in detail by means of an exemplary embodiment. Only the presently relevant aspects of the inventive method are illustrated in FIG. 1; all other aspects have been omitted for the sake of clarity.

DETAILED DESCRIPTION OF THE DRAWING

FIG. 1 in detail visualizes laser-treating a cast aluminum component 2 by means of a pulsed laser system 1. The laser treatment is provided in order for the surface topology and the surface tension of the cast aluminum component 2 to be pre-treated such that the adhesion to a joining partner in the step of the integral bonding of the cast aluminum component 2 to the joining partner, subsequent to the laser treatment, is increased, and the adhesive strength between the workpieces joined by integral bonding is thus high. This facilitates a high degree of durability of the join connection.

An aluminum alloy having an aluminum content of at least 70% by mass is preferably applied as the aluminum material for the cast aluminum component 2.

The laser system 1 emits pulsed waves (indicated in FIG. 1 by h v) onto a region 3 of the cast aluminum component 2 to be connected to the joining partner, said waves having a pulse duration of 100 to 200 ns, and an impulse frequency of 10 to 80 kHz. On account thereof, a very high quantity of energy acts repeatedly over a very short time on envisaged regions of the cast aluminum component 2, said quantity of energy changing the surface properties of the treated region of the cast aluminum component 2 and preparing said surface properties for a subsequent step of integral bonding to the joining partner, for example by adhesive bonding.

As is further illustrated in FIG. 1, the pulsed laser light, by way of the high energy density thereof, can be applied in a targeted focused manner and to specific regions, on account of which, depending on the envisaged design embodiment of the joining region, spot geometries 4 having a point-to-point overlap and linear overlaps result in an exemplary manner. To this end, a Nd:YAG laser which has a wavelength of 1064 nm and a beam diameter of 500 to 1000 μm, in particular of 700 μm, can be advantageously used.

A system having the following components can be used as a laser system, for example:

Radiation source: Rofin DQ*80/serial number: 013;
Scanner: SCANLAB hurry SCAN 25;
Cooling device for the radiation source: KKT vBoxX;
Conducting fiber from the radiation source to the scanner: round.

The preceding description of the embodiment of the present invention serves only illustrative purposes and not the purpose of limiting the invention. Various changes and modifications are possible within the context of the invention without departing from the scope of the invention and the equivalents of the latter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Laser system
2 Cast aluminum component
3 Region to be connected
4 Spot geometry

What is claimed is:

1. A method for integrally bonding a cast aluminum component to a joining partner, the method comprising:
modifying a surface topology and surface tension of a region of the cast aluminum component that is to be connected to the joining partner using a laser-treatment, wherein
the laser treatment is carried out via a pulsed laser system having a pulse duration of 100 to 200 ns, and an impulse frequency of 10 to 80 kHz,
integrally bonding the cast aluminum component and the joining partner, and
a content of aluminum in the cast aluminum component is 70% by mass in relation to the total weight of the cast aluminum component.

2. The method as claimed in claim 1, wherein the integral bonding of the cast aluminum component to the joining partner after the laser treatment is carried out without any further treatment of the region of the cast aluminum component that is to be connected to the joining partner.

3. The method as claimed in claim 2, wherein the impulse frequency is 10 to 40 kHz.

4. The method as claimed in claim 3, wherein the pulse duration is 120 to 160 ns.

5. The method as claimed in claim 4, wherein a wavelength of the laser system is 800 to 1200 nm.

6. The method as claimed in claim 5, wherein a beam diameter of the laser system is 500 to 1000 μm.

7. The method as claimed in claim 5, wherein a mean laser output is 700 to 1000 W.

8. The method as claimed in claim 7, wherein the integral bonding is performed by adhesive bonding, welding, or brazing/soldering.

9. The method as claimed in claim 8, further comprising using the pulsed laser system having the pulse duration of 100 to 200 ns, and the impulse frequency of 10 to 80 kHz, to connect a cast aluminum component to a joining partner.

10. A component comprising a cast aluminum component and a joining partner, wherein the component is produced by a method as claimed in claim 8.

11. The method as claimed in claim 4, wherein a wavelength of the laser system is 1064 nm.

12. The method as claimed in claim 1, wherein treatment of the 70% by mass cast aluminum by the pulsed laser system transforms peripheral regions of the cast aluminum component so as to increase a resistance to corrosion thereof compared to regions other than the peripheral regions.

\* \* \* \* \*